March 2, 1943.  H. J. LUFF  2,312,659
COMBINED SOIL WASTE AND VENT FITTING
Filed May 7, 1942
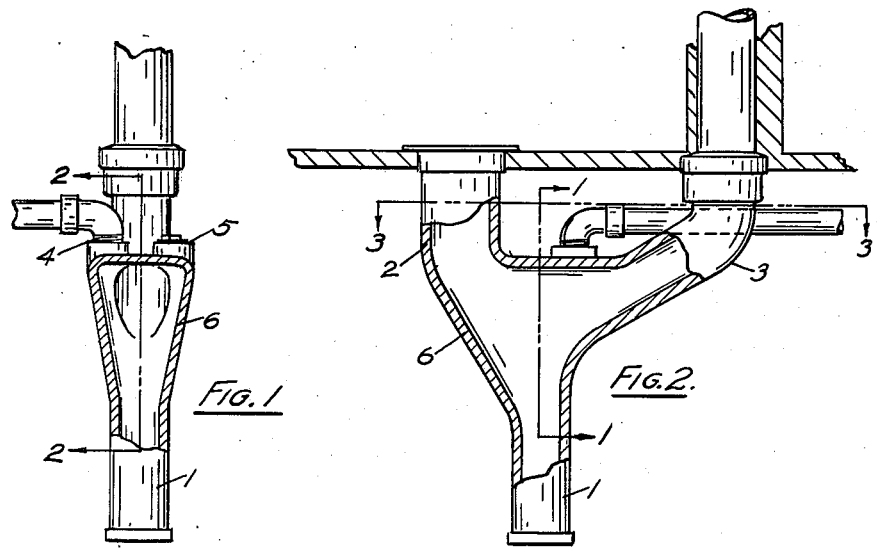
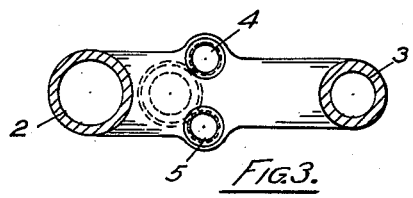
INVENTOR.
HENRY J. LUFF
BY
Florian G. Miller
Atty.

Patented Mar. 2, 1943

2,312,659

UNITED STATES PATENT OFFICE 2,312,659

COMBINED SOIL WASTE AND VENT FITTING

Henry J. Luff, Cleveland, Ohio, assignor to J. A. Zurn Manufacturing Company, Erie, Pa., a corporation of Pennsylvania Application May 7, 1942, Serial No. 442,127

1 Claim. (Cl. 285—210)

This invention relates generally to plumbing fixtures and more particularly to a combined soil waste and vent fitting.

All devices of this character made according to the teachings of the prior art and with which I am familiar have provided inadequate means to supply air to the soil and waste fitting with the result that there would be a siphonage of the water in the trap, allowing noxious gases from the drain line to pass into the interior of the building. Although there has been a branch of the fitting leading to the air vent pipe in prior fittings, it has been found that the size and location of said branch has been inadequate to prevent siphonage of the trap.

It is accordingly an object of my invention to overcome the above and other difficulties in a combined soil waste and vent fitting, and it is more particularly an object of my invention to provide a combined soil waste and vent fitting which is simple in construction and economical in cost and manufacture.

Another object of my invention is to provide a combined soil waste and vent fitting whereby air is supplied to the fitting at all times to prevent siphonage.

Another object of my invention is to provide a combined soil waste and vent fitting wherein an enlarged portion is provided for a supply of air to the branches of said fitting.

Another object of my invention is to provide a combined soil waste and vent fitting which requires a minimum of space for installation.

Other objects of my invention will become evident from the following detailed description taken in conjunction with the accompanying drawing in which:

Fig. 1 is an end elevational view with parts broken away of my novel combined soil waste and vent fitting.

Fig. 2 is a view taken on the line 2—2 of Fig. 1.

Fig. 3 is a view taken on the line 3—3 of Fig. 2.

Referring now to the drawing, Figs. 1 and 2 show a combined soil waste and vent fitting having a lower branch 1 leading to a main drain line, a second branch 2 for soil waste and another branch 3 leading to the air vent. Waste lines 4 and 5 for waste water from the bathtub, washbowls and the like enter the top of the fitting. The lower branch 1 of the fitting is flared upwardly and outwardly at 6 as shown in Fig. 1, thereby providing a greatly enlarged central portion of the fitting. By providing such an enlarged portion in the central portion of the fitting and where the waste lines 4 and 5 enter the fitting, it will be apparent that a supply of air will always be present in the fitting because of the large area in the central portion of the fitting. When soil waste and other waste water are entering the fitting at the same time, it will be evident that there will be a large volume of water passing through the fitting. By providing a fitting whereby a substantial head may be built up therein without cutting off the supply of air from the air vent branch 3, no part of the fitting will be sealed at any time by the water passing therethrough and therefore no siphonage will occur.

From the above, it will be seen that I have provided a combined soil waste and vent fitting which protects the soil and waste branches of the fitting by a novel means for supplying air to prevent siphonage.

Various changes may be made in the embodiment of the present invention without departing from the spirit thereof or from the scope of the appended claim.

What I claim is:

A combined soil waste and vent fitting comprising a body member having outwardly extending branches, the lower branch being for drainage and the other branches being for soil waste and air, said body member having the sides thereof tapered outwardly and having a substantially flat top portion disposed a maximum distance above said drainage branch whereby the head of the water entering said drainage branch may be built up to a maximum height, and waste lines entering through the flat upper portion of said body member.

HENRY J. LUFF.